(12) United States Patent
Chang et al.

(10) Patent No.: US 8,451,416 B2
(45) Date of Patent: May 28, 2013

(54) LIQUID CRYSTAL DISPLAY PANEL WITH UNIFORM COMPRESSING DENSITY BY COOPERATING MAIN AND COMPENSATION SPACERS

(75) Inventors: Tsung-Chien Chang, Taipei County (TW); Chien-Kuo He, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 27 days.

(21) Appl. No.: 12/869,786

(22) Filed: Aug. 27, 2010

(65) Prior Publication Data

US 2010/0321625 A1     Dec. 23, 2010

Related U.S. Application Data

(62) Division of application No. 11/308,277, filed on Mar. 15, 2006, now abandoned.

(51) Int. Cl.
*G02F 1/1339* (2006.01)
(52) U.S. Cl.
USPC .......................................... 349/155; 349/157

(58) Field of Classification Search
USPC .......................................... 349/146, 155, 157
See application file for complete search history.

(56) References Cited

U.S. PATENT DOCUMENTS

2005/0088606 A1 *   4/2005   Ashizawa et al. ............. 349/156

* cited by examiner

*Primary Examiner* — Lauren Nguyen
(74) *Attorney, Agent, or Firm* — Jianq Chyun IP Office

(57) ABSTRACT

An LCD panel including a first substrate, multiple horizontal and vertical conductive lines, support pads to form first protrusions, a second substrate, a main spacer, a compensation spacer, and a liquid crystal layer is provided. The main spacer and the compensation spacer are in sliding contact with the first protrusions in the horizontal or vertical direction in a plane of the LCD panel, and the compensation spacer is disposed around the main spacer and corresponding first protrusions are next to the compensation spacer. In the horizontal or vertical direction, the main spacer is partially contacted with the first protrusion to obtain a reduced contacting area, and the compensation spacer is partially contacted with the adjacent first protrusion to obtain an increased contacting area. The reduced contacting area between the main spacer and the first protrusion is equal to the increased contacting area between the compensation spacer and the first protrusion.

11 Claims, 8 Drawing Sheets

LIQUID CRYSTAL DISPLAY PANEL WITH UNIFORM COMPRESSING DENSITY BY COOPERATING MAIN AND COMPENSATION SPACERS

CROSS-REFERENCE TO RELATED APPLICATION

This application is a divisional application of and claims the priority benefit of an application Ser. No. 11/308,277, filed on Mar. 15, 2006, now pending. The entirety of the above-mentioned patent application is hereby incorporated by reference herein and made a part of this specification.

BACKGROUND OF THE INVENTION

1. Field of Invention

The present invention relates to a liquid crystal display (LCD) panel. More particularly, the present invention relates to an LCD panel which allows the spacers to have uniform compressing density by applying biased compensation.

2. Description of Related Art

An LCD panel is generally formed by a thin film transistor array substrate (TFT array substrate) and a color filter substrate (CF substrate). A gap has to be sustained between the TFT array substrate and the CF substrate with spacers to fill in a liquid crystal layer between the two substrates. Generally, the spacers are disposed on the CF substrate and are in contact with the TFT array substrate.

However, during assembly process, the spacers of an LCD panel may shift along with the shift of the panel that the area density (i.e. compressing density) of the spacers which is in contact with the TFT array substrate will also be changed. Thus, the gap between the two substrates will not be uniform, which affects the display quality of the panel.

Accordingly, shift stopping and biased compensation are provided in the conventional technology to resolve the problem of the poor display quality resulted from spacer shift. FIGS. 1A and 1B are cross-sectional views of two conventional LCD panels. First, referring to FIG. 1A, the LCD panel 100 includes a TFT array substrate 110, a CF substrate 120, and a liquid crystal layer 130 located between the two substrates. Moreover, the TFT array substrate 110 has a plurality of protrusions 112, and a groove 114 is located between two protrusions 112. It is remarkable that the spacer 140 is disposed on the CF substrate 120 and in contact with the groove 114 to prevent the spacer 140 from moving.

Then, referring to FIG. 1B, the LCD panel 200 also has a TFT array substrate 210, a CF substrate 220, and a liquid crystal layer 230 located between the two substrates. Wherein, there is a drain 212 on the TFT array substrate 210 and a planarized layer 216 covers the drain 212. By fabricating a contact window opening 216a in the planarized layer 216 above the drain 212, the pixel electrode 214 is electrically connected to the drain 212 through the contact window opening 216a. It is remarkable that the spacer 240 is disposed on the CF substrate 220 and locked in the contact window opening 216a to prevent the spacer 240 from moving.

The spacers 140 and 240 can be prevented from moving and further the panels can be prevented from shifting through the shift stopping methods shown in FIGS. 1A and 1B. However, because the external power shifting the panels is generally stronger, the spacers 140 and 240 may be pushed out of the groove 114 or the contact window opening 216a, which may affect the supporting performance of the spacers 140 and 240 and the uniformity of the gap d.

In addition, FIG. 2A is a cross-sectional view of another conventional LCD panel. In the LCD panel 300, a plurality of spacers 344 and 342 (only one is shown) are respectively fabricated on the TFT array substrate 310 and the CF substrate 320, the spacers 344 are partially in contact with the spacers 342 to sustain the gap d of the panel, and the liquid crystal layer 330 is disposed between the two substrates.

FIG. 2B is a top view of the spacers in FIG. 2A. Referring to both FIG. 2A and FIG. 2B, when the CF substrate 320 shifts rightward, the contacting area R1 between the spacers 342 and 344 in the first spacer group A1 is reduced, while the contacting area R2 between the spacers 342 and 344 in the second spacer group A2 is increased, thus the contacting area R1 of the first spacer group A1 and the contacting area R2 of the second spacer group A2 can compensate each other horizontally. Based on the same principle, the contacting area R3 of the third spacer group A3 and the contacting area R4 of the fourth spacer group A4 can compensate each other vertically.

However, the LCD panel 300 as shown in FIGS. 2A and 2B is only applicable when the panel does not shifts too much, that is, the distance the panel shifts is within the range of half the sizes of the spacers 342 and 344. Along with the development of large size panels, the panel shift will increase accordingly. Hence, the methods described above will become ineffective; the problems of unevenness of the compressing density of the spacers, non-uniformity of the panel gap, and poor panel display performance still remain unsolved.

SUMMARY OF THE INVENTION

Accordingly, the present invention is directed to provide an LCD panel to solve the problems in a large size panel of uneven compressing density of spacers, non-uniform gap, and unsatisfactory display performance of the panel due to excessive panel shift.

To achieve the aforementioned and other objectives, the present invention further provides an LCD panel, having a horizontal direction and a vertical direction in a plane, includes a first substrate, a plurality of horizontal and vertical conductive lines, a plurality of support pads, a second substrate, a main spacer, a compensation spacer, and a liquid crystal layer. The horizontal and vertical conductive lines are disposed on the first substrate and divide the first substrate into a first area, a second area, and a third area. The support pads are respectively disposed under at least one of the horizontal and vertical conductive lines to form a plurality of first protrusions. The second substrate is disposed over the first substrate and partially overlapped with the first substrate in the horizontal or vertical direction. The main spacer and the compensation spacer are disposed on the second substrate. The main spacer and the compensation spacer are in sliding contact with the first protrusions in the horizontal or vertical direction, and the compensation spacer is disposed around the main spacer and corresponding first protrusions are also disposed next to the compensation spacer. The liquid crystal layer is disposed between the first substrate and the second substrate; in the horizontal or vertical direction, the main spacer is partially contacted with the first protrusion to obtain a reduced contacting area, at the same time, the compensation spacer is partially contacted with the adjacent first protrusion to obtain an increased contacting area, and the reduced contacting area between the main spacer and the first protrusion is equal to the increased contacting area between the compensation spacer and the first protrusion.

According to an embodiment of the present invention, the area of the aforementioned first protrusion is greater than the areas of the main spacer and the compensation spacer.

According to an embodiment of the present invention, the area of the aforementioned first protrusion is smaller than the areas of the main spacer and the compensation spacer.

According to an embodiment of the present invention, the aforementioned horizontal conductive lines include a first horizontal conductive line, a second horizontal conductive line, and a third horizontal conductive line, and the second horizontal conductive line is disposed between the first horizontal conductive line and the third horizontal conductive line. The compensation spacer includes a first compensation spacer and a second compensation spacer respectively disposed on the first horizontal conductive line and the third horizontal conductive line in the first area; the main spacer retracts a first distance from the edge of the first protrusion in contact therewith along direction −X and a second distance along direction +X; the first compensation spacer is at the aforementioned second distance from the first protrusion disposed on the first horizontal conductive line in the first area; and the second compensation spacer is at the aforementioned first distance from the first protrusion disposed on the third horizontal conductive line in the first area.

According to an embodiment of the present invention, in response to a shifting distance of the aforementioned main spacer along direction −X being greater than the second distance and smaller than the sum of the second distance and the width of the first compensation spacer itself on axis X, the first compensation spacer will contact the first protrusion on the first horizontal conductive line so that the reduced contacting area between the main spacer and the first protrusion on the second horizontal conductive line is equal to the increased contacting area between the first compensation spacer and the first protrusion on the first horizontal conductive line.

According to an embodiment of the present invention, in response to a shifting distance of the aforementioned main spacer along direction +X being greater than the first distance and smaller than the sum of the first distance and the width of the second compensation spacer itself on axis X, the second compensation spacer will contact the first protrusion on the third horizontal conductive line so that the reduced contacting area between the main spacer and the first protrusion on the second horizontal conductive line is equal to the increased contacting area between the second compensation spacer and the first protrusion on the third horizontal conductive line.

According to an embodiment of the present invention, the aforementioned compensation spacer further includes a third compensation spacer and a fourth compensation spacer respectively disposed on the second horizontal conductive line in the second area and the second horizontal conductive line in the third area; the main spacer is at a third distance from the upper edge of the second horizontal conductive line along direction +Y and at a fourth distance from the lower edge of the second horizontal conductive line along direction −Y; the third compensation spacer is at the aforementioned third distance from the first protrusion on the second horizontal conductive line in the second area; and the fourth compensation spacer is at the aforementioned fourth distance from the first protrusion on the second horizontal conductive line in the third area.

According to an embodiment of the present invention, in response to a shifting distance of the aforementioned main spacer along direction −Y being greater than the fourth distance and smaller than the sum of the fourth distance and the width of the fourth compensation spacer itself on axis Y, the fourth compensation spacer will contact the first protrusion on the second horizontal conductive line in the third area so that the reduced contacting area between the main spacer and the first protrusion on the second horizontal conductive line is equal to the increased contacting area between the fourth compensation spacer and the first protrusion on the second horizontal conductive line in the third area.

According to an embodiment of the present invention, in response to a shifting distance of the aforementioned main spacer along direction +Y being greater than the third distance and smaller than the sum of the third distance and the width of the third compensation spacer itself on axis Y, the third compensation spacer will contact the first protrusion on the second horizontal conductive line in the second area so that the reduced contacting area between the main spacer and the first protrusion on the second horizontal conductive line is equal to the increased contacting area between the third compensation spacer and the first protrusion on the second horizontal conductive line in the second area.

According to an embodiment of the present invention, at least one of the aforementioned horizontal and vertical conductive lines includes a scan line, a Cs line, or a data line.

According to an embodiment of the present invention, the aforementioned first substrate includes TFT array substrate.

According to an embodiment of the present invention, the aforementioned second substrate includes CF substrate.

In summary, according to the present invention, a main spacer and a compensation spacer are disposed, and the reduced contacting area between the main spacer and the first protrusion is made equal to the increased contacting area between the compensation spacer and another first protrusion, uniform compressing density of spacers and consistent panel gap can be obtained even when the panel shifts a great distance. Accordingly, the LCD panel of the present invention has better display performance.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The First Embodiment

Figure 1A:
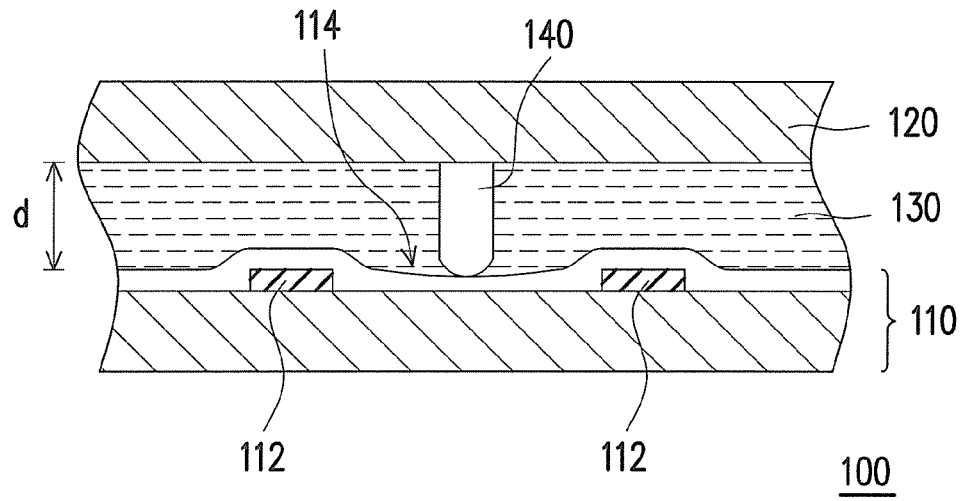
FIGS. 1A and 1B are cross-sectional views of two conventional LCD panels.
Figure 1B:
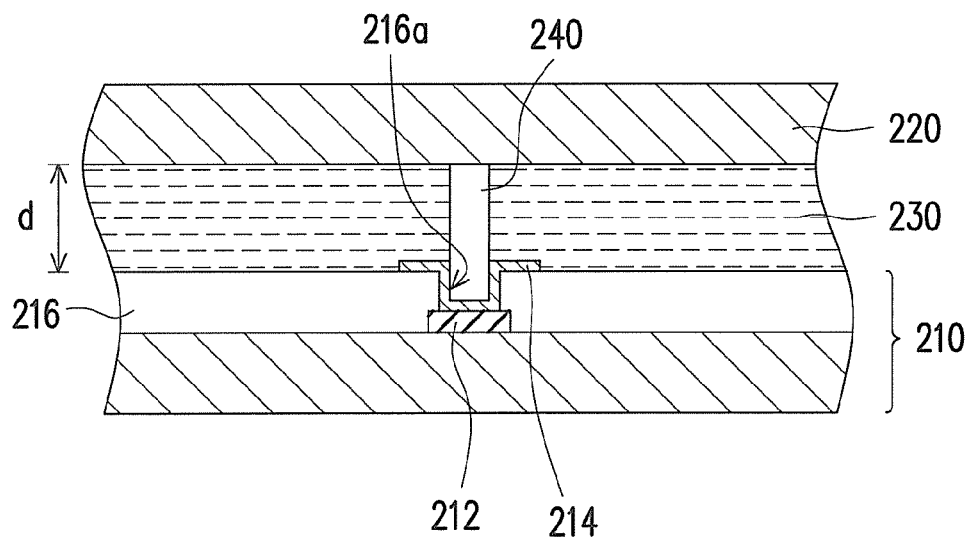
Figure 2A:
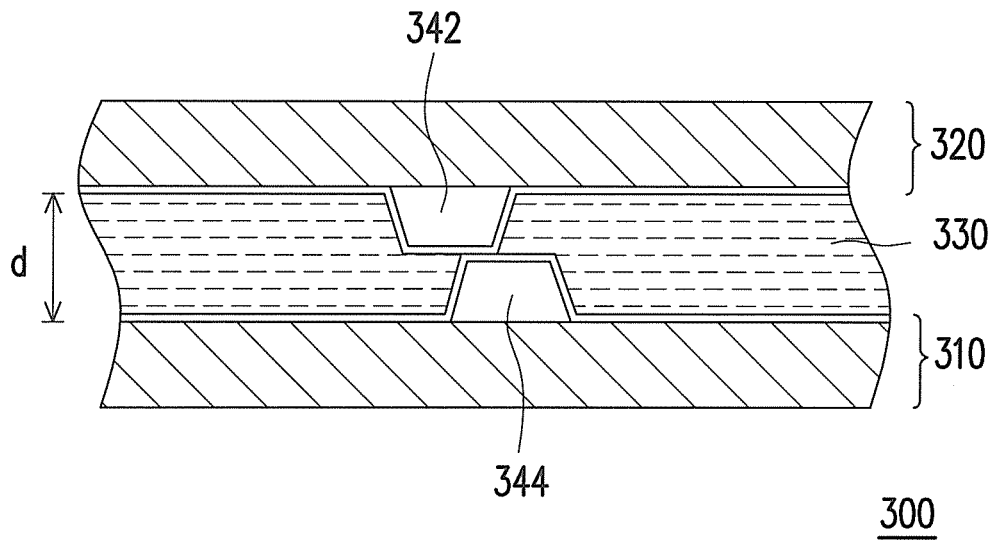
FIG. 2A is a cross-sectional view of another conventional LCD panel.
Figure 2B:
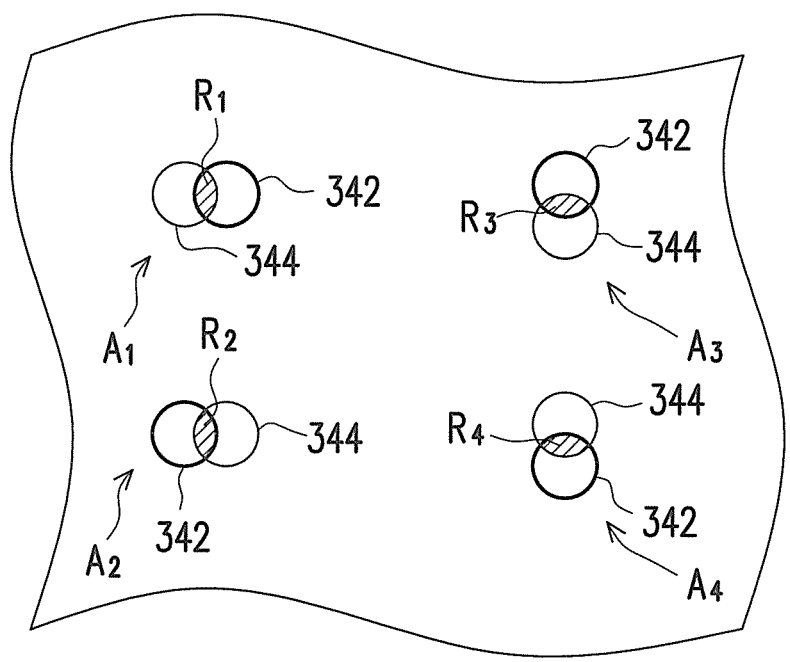
FIG. 2B is a top view of the spacers in FIG. 2A.
Figure 3:
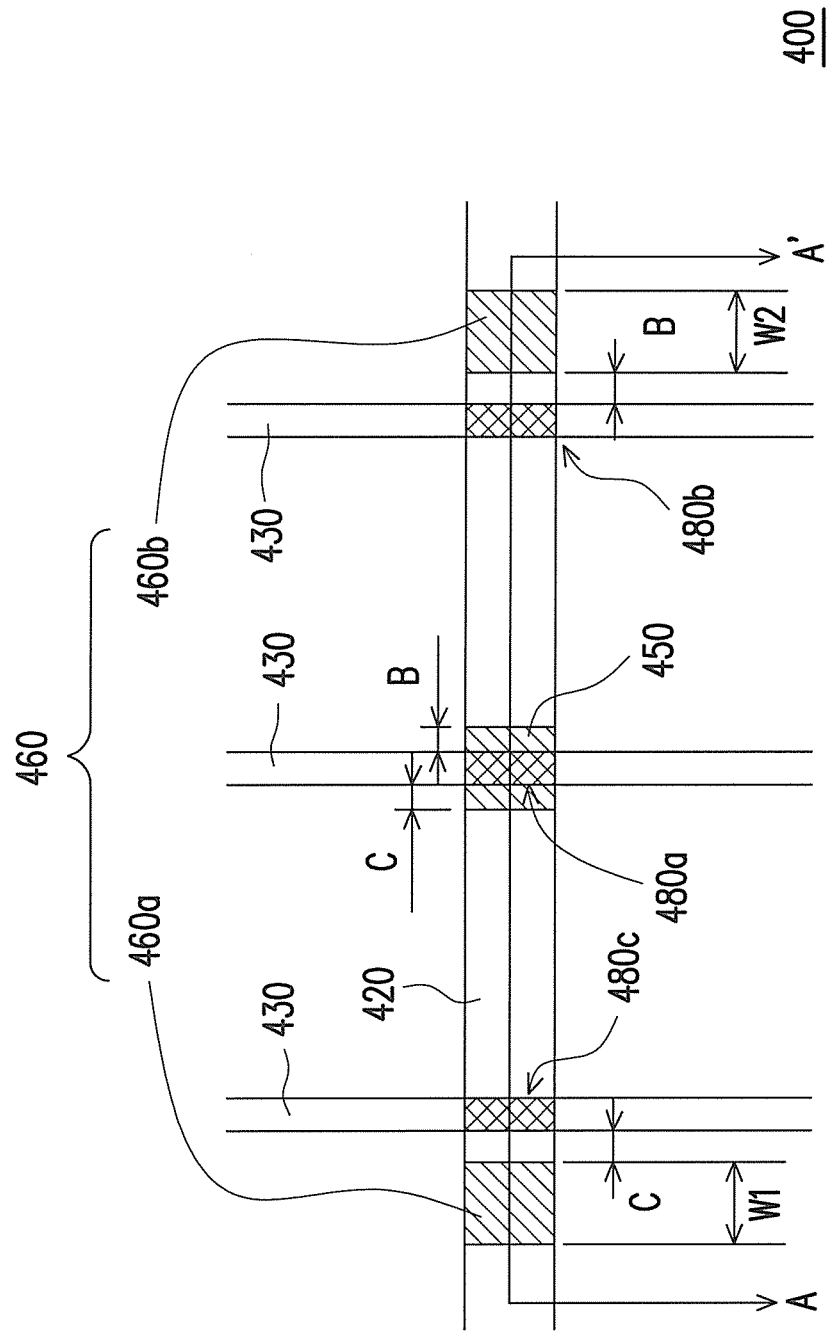
FIG. 3 is a partial top view of an LCD panel according to the first embodiment of the present invention.
Figure 3A:
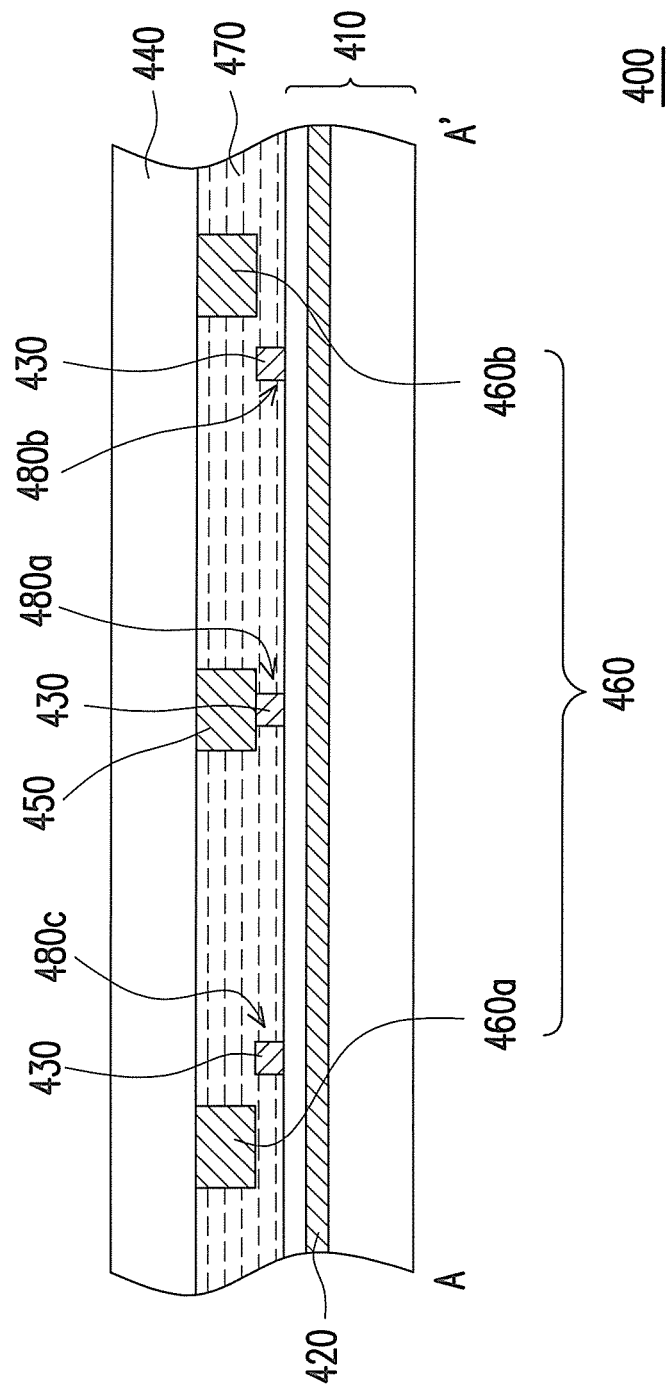
FIG. 3A is a cross-sectional view of the LCD panel in FIG. 3 along line A-A'.

FIG. 3 is a partial top view of a LCD panel according to the first embodiment of the present invention. FIG. 3A is a cross-sectional view of the LCD panel in FIG. 3 along line A-A'.

Referring to both FIG. 3 and FIG. 3A, the LCD panel 400 includes a first substrate 410, a plurality of horizontal conductive lines 420 and vertical conductive lines 430, a second substrate 440, a main spacer 450, a compensation spacer 460, and a liquid crystal layer 470. The horizontal conductive lines 420 and the vertical conductive lines 430 are disposed on the first substrate 410 and overlapped with each other to form a plurality of first protrusions 480a, 480b, and 480c. The second substrate 440 is disposed over the first substrate 410. The main spacer 450 and the compensation spacer 460 are disposed on the second substrate 440. The main spacer 450 is in sliding contact with the first protrusion 480a, and the compensation spacer 460 is disposed around the main spacer 450. The liquid crystal layer 470 is disposed between the first substrate 410 and the second substrate 440. Wherein, when shift occurs between the first substrate 410 and the second substrate 440, the main spacer 450 moves away from the first protrusion 480a, at the same time, the compensation spacer 460 comes into contact with the adjacent first protrusions 480b/480c, and the reduced contacting area between the main spacer 450 and the first protrusion 480a is equal to the increased contacting area between the compensation spacer 460 and the first protrusions 480b/480c.

In an embodiment, the horizontal conductive lines 420 may be scan lines, or Cs lines, while the vertical conductive lines 430 may be data lines, or Cs lines. In addition, the first substrate 410 may be a thin film transistor array substrate (TFT array substrate), and the second substrate 440 may be a color filter substrate (CF substrate).

Referring to FIG. 3, the areas of the first protrusions 480a, 480b, and 480c are smaller than the areas of the main spacer 450 and the compensation spacer 460. However, in another embodiment, the areas of the first protrusions 480a, 480b, and 480c may be greater than the areas of the main spacer 450 and the compensation spacer 460 (not shown).

The biased compensation in horizontal direction of the LCD panel 400 in the present embodiment will be further described below. Referring to FIG. 3, in an embodiment, the compensation spacer 460 includes a first compensation spacer 460a and a second compensation spacer 460b. The main spacer 450, the first compensation spacer 460a, and the second compensation spacer 460b are disposed corresponding to the same horizontal conductive line 420, and the main spacer 450 is disposed between the first compensation spacer 460a and the second compensation spacer 460b.

It is remarkable that the main spacer 450 protrudes a first distance B from the edge of the first protrusion 480a in contact therewith along direction +X and a second distance C along direction –X. The first compensation spacer 460a is at the aforementioned second distance C from the adjacent vertical conductive line 430. The second compensation spacer 460b is at the aforementioned first distance B from the adjacent vertical conductive line 430.

When the shifting distance of the main spacer 450 along direction –X is greater than the first distance B and smaller than the sum of the first distance B and the width W2 of the second compensation spacer 460b itself on axis X, the second compensation spacer 460b will be in contact with the adjacent first protrusion 480b so that the reduced contacting area between the main spacer 450 and the first protrusion 480a is equal to the increased contacting area between the second compensation spacer 460b and the first protrusion 480b.

In addition, when the shifting distance of the main spacer 450 along direction +X is greater than the second distance C and smaller than the sum of the second distance C and the width W1 of the first compensation spacer 460a itself on axis X, the first compensation spacer 460a will be in contact with the adjacent first protrusion 480c so that the reduced contacting area between the main spacer 450 and the first protrusion 480a is equal to the increased contacting area between the first compensation spacer 460a and the first protrusion 480c.

Accordingly, the main spacer 450 has a compensation value of the first distance B in direction –X and the second distance C in direction +X when the horizontal shifting distance of the LCD panel 400 is relatively small. Moreover, according to the design described above, the LCD panel 400 can compensate the horizontal shift within the range of "W1+C" or "W2+B" when the horizontal shift of the panel is greater than the first distance B or the second distance C. Thus, the LCD panel 400 of the present invention can compensate larger panel shift horizontally. Accordingly, the LCD panel 400 can obtain uniform compressing density of the spacers and even panel gap, and further better display performance, even though the panel shift is large.

The Second Embodiment

Figure 4:
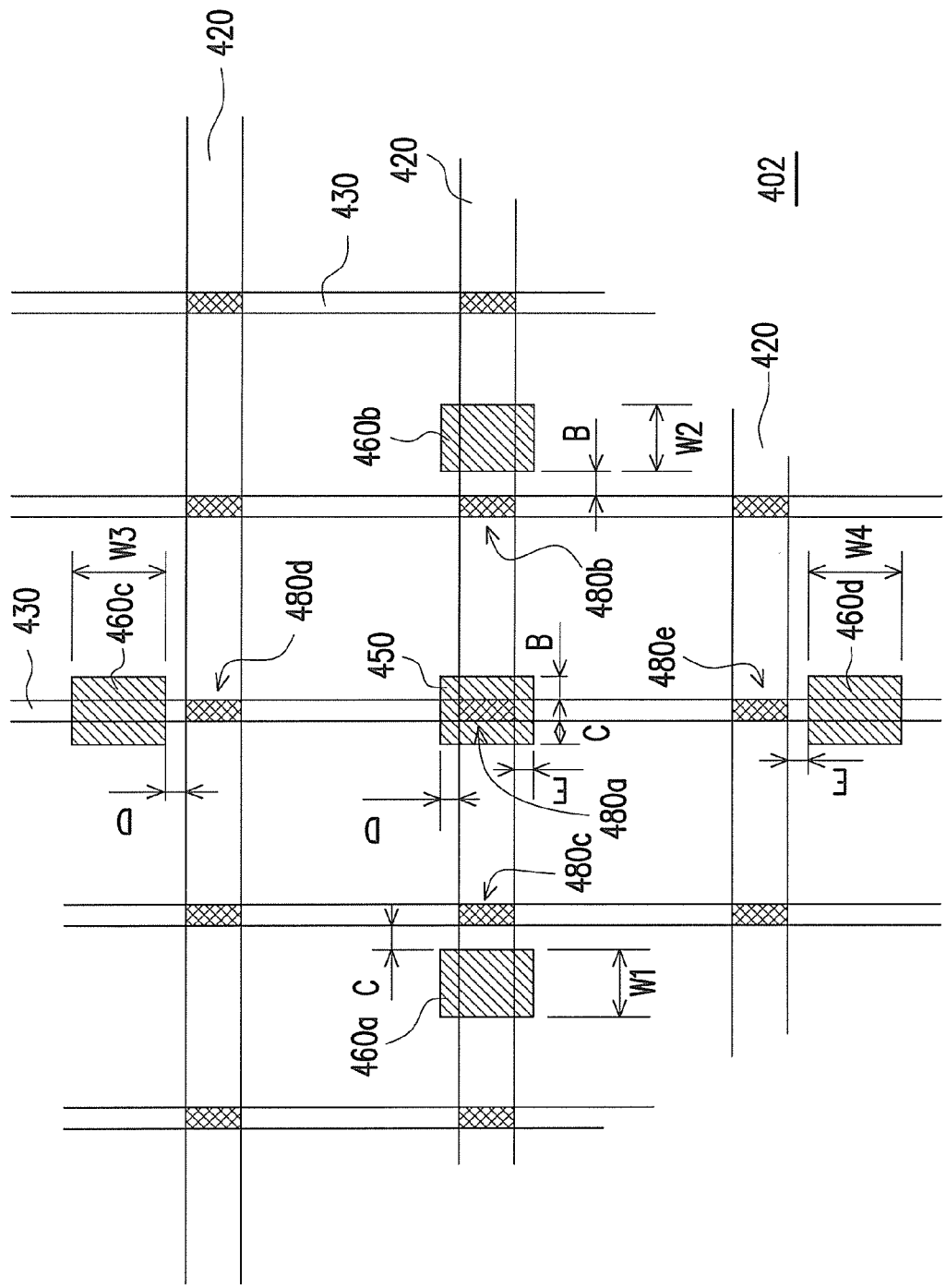
FIG. 4 is a top view of an LCD panel according to the second embodiment of the present invention.

FIG. 4 is a top view of an LCD panel according to the second embodiment of the present invention. Referring to FIG. 4, the LCD panel 402 has compensation spacers 460 both horizontally and vertically, wherein the disposition of the first compensation spacer 460a and the second compensation spacer 460b in horizontal direction is the same as that shown in FIG. 3, so the detail will not be described again.

In addition, the horizontal conductive lines 420 may be scan lines, or Cs lines, while the vertical conductive lines 430 may be data lines, or Cs lines. Moreover, the first substrate 410 may be TFT array substrate, while the second substrate 440 may be CF substrate.

Similarly, the areas of the first protrusions 480a, 480b, 480c, 480d, and 480e shown in FIG. 4 may be smaller than the areas of the main spacer 450 and the compensation spacer 460. However, the areas of the first protrusions 480a, 480b, 480c, 480d, and 480e may also be greater than the areas of the main spacer 450 and the compensation spacer 460 (not shown).

It is remarkable that the compensation spacer 460 in the LCD panel 402 may further include a third compensation spacer 460c and a fourth compensation spacer 460d. The main spacer 450, the third compensation spacer 460c, and the fourth compensation spacer 460d are disposed corresponding to the same vertical conductive line 430, and the main spacer 450 is disposed between the third compensation spacer 460c and the fourth compensation spacer 460d.

In particular, the main spacer 450 protrudes a third distance D from the edge of the first protrusion 480a in contact therewith along direction +Y and a fourth distance E along direction –Y. The third compensation spacer 460c is at the aforementioned third distance D from the adjacent horizontal conductive line 420, and the fourth compensation spacer 460d is at the aforementioned fourth distance E from the adjacent horizontal conductive line 420.

When the shifting distance of the main spacer 450 along direction –Y is greater than the third distance D and smaller than the sum of the third distance D and the width W3 of the third compensation spacer 460c itself on axis Y, the third compensation spacer 460c will be in contact with the adjacent first protrusion 480d so that the reduced contacting area between the main spacer 450 and the first protrusion 480a is equal to the increased contacting area between the third compensation spacer 460c and the first protrusion 480d.

When the shifting distance of the main spacer 450 along direction +Y is greater than the fourth distance E and smaller than the sum of the fourth distance E and the width W4 of the fourth compensation spacer 460d itself on axis Y, the fourth compensation spacer 460d will be in contact with the adjacent first protrusion 480e so that the reduced contacting area between the main spacer 450 and the first protrusion 480a is equal to the increased contacting area between the fourth compensation spacer 460d and the first protrusion 480e.

Accordingly, the main spacer 450 itself has the compensation value of the third distance D in direction −Y and the fourth distance E in direction +Y when the vertical shift of the LCD panel 402 is little. Moreover, according to the design described above, the LCD panel 402 can compensate the vertical shift within the range of "W3+D" or "W4+E" when the vertical panel shift is greater than the third distance D or the fourth distance E.

Moreover, since the first compensation spacer 460a and the second compensation spacer 460b are also disposed in the LCD panel 402, it can compensate the horizontal panel shift within the range of "W1+C" or "W2+B". Thus, in the present embodiment, the LCD panel 402 allows large panel shift both horizontally and vertically. Accordingly, the LCD panel 402 can have uniform compressing density of the spacers and even panel gap, and further better display performance, even though the panel shift is large.

The Third Embodiment

Figure 5:
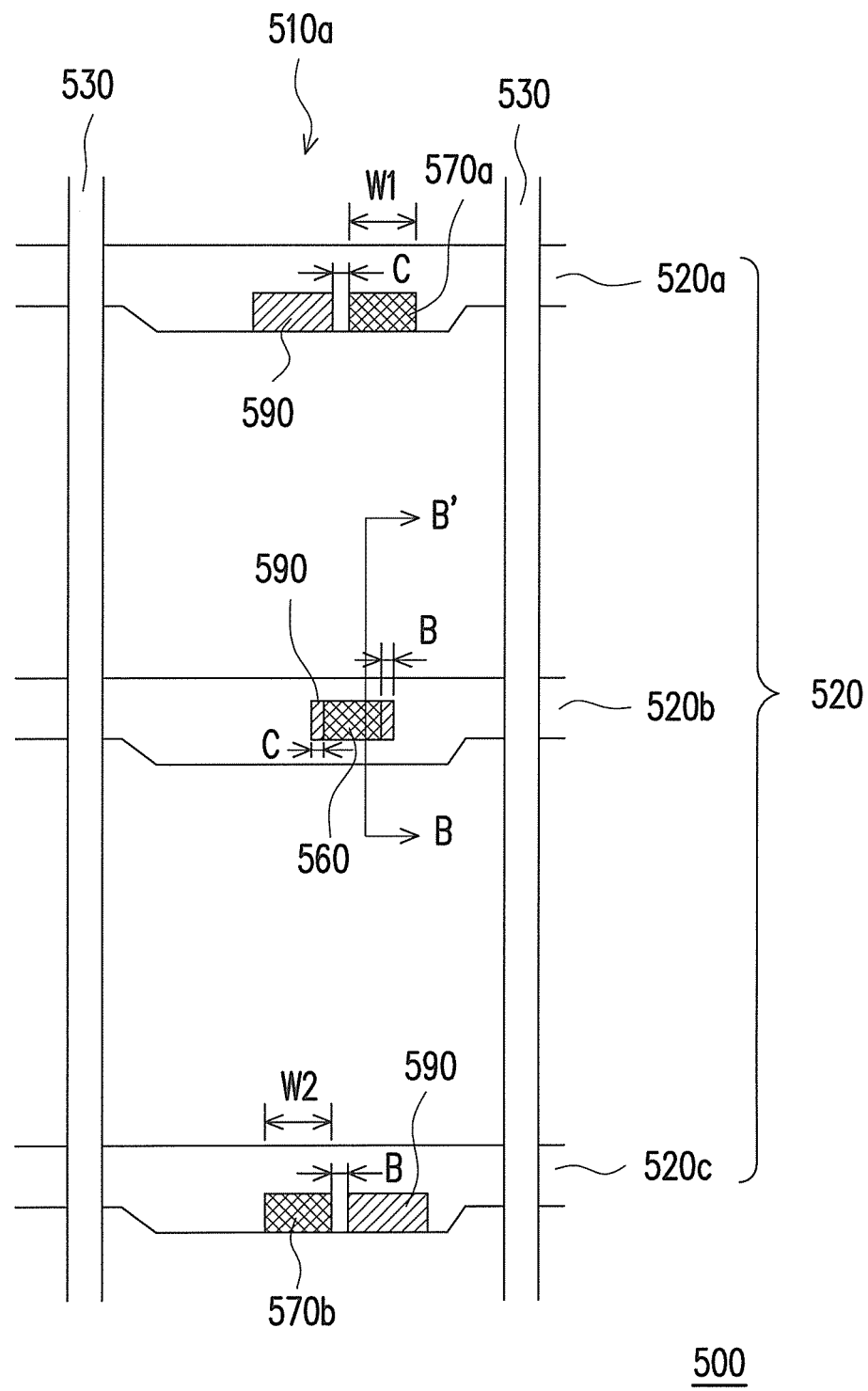
FIG. 5 is a top view of an LCD panel according to the third embodiment of the present invention.
Figure 5A:
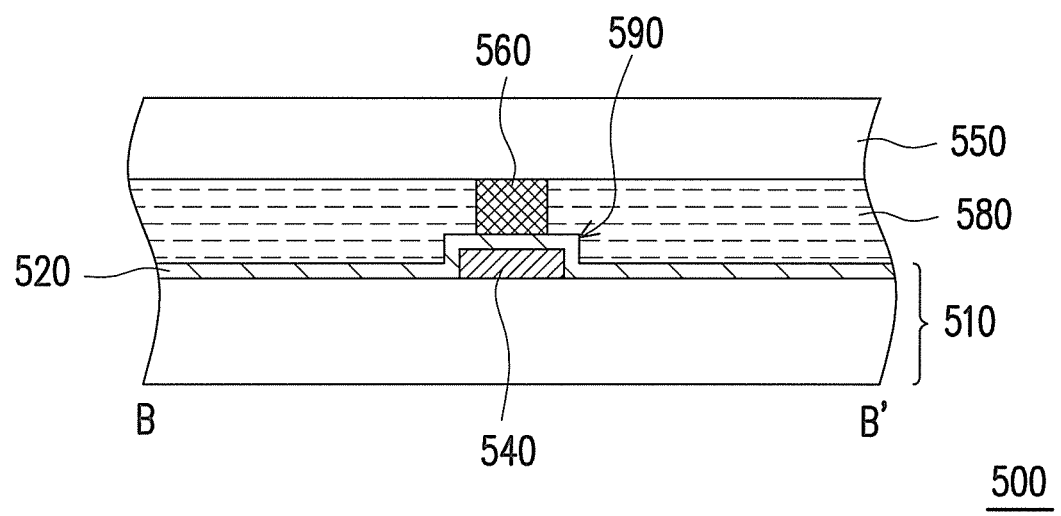
FIG. 5A is a cross-sectional view of the LCD panel in FIG. 5 along line B-B'.
Figure 6:
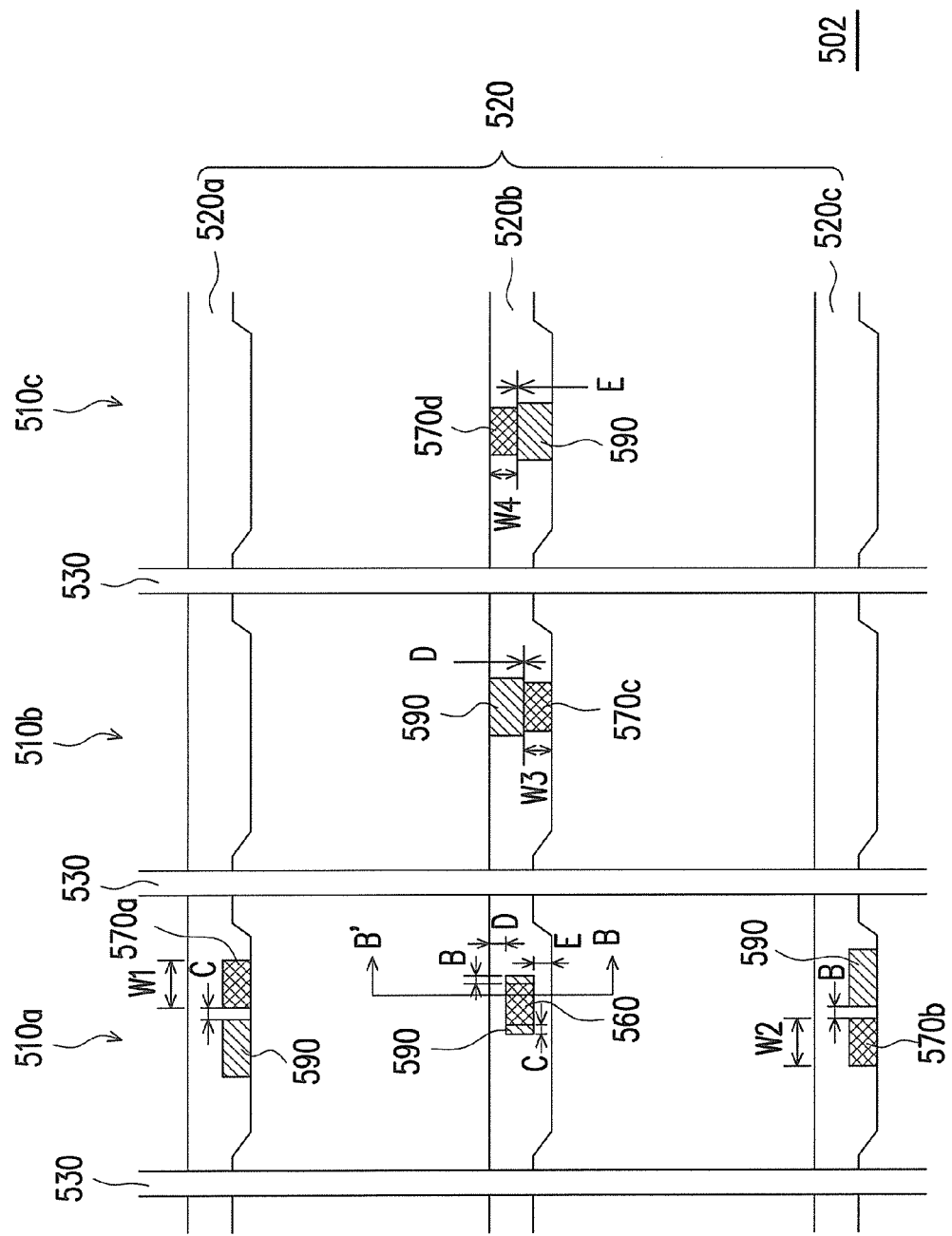
FIG. 6 is a top view of an LCD panel according to the fourth embodiment of the present invention.

FIG. 5 is a top view of an LCD panel according to the third embodiment of the present invention. FIG. 5A is a cross-sectional view of the LCD panel in FIG. 5 along line B-B'. Referring to both FIG. 5 and FIG. 5A, the LCD panel 500 includes a first substrate 510, a plurality of horizontal conductive lines 520 and a plurality of vertical conductive lines 530, a plurality of support pads 540, a second substrate 550, a main spacer 560, a compensation spacer 570, and a liquid crystal layer 580. The horizontal conductive lines 520 and the vertical conductive lines 530 are disposed on the first substrate 510 and divide the first substrate 510 into a first area 510a, a second area 510b (as shown in FIG. 6) and a third area 510c (as shown in FIG. 6). The support pads 540 are respectively disposed under at least one of the horizontal conductive lines 520 and the vertical conductive lines 530 to form a plurality of first protrusions 590. The second substrate 550 is disposed above the first substrate 510. The main spacer 560 and the compensation spacer 570 are disposed on the second substrate 550. The main spacer 560 is in sliding contact with the first protrusion 590, and the compensation spacer 570 is disposed around the main spacer 560. The liquid crystal layer 580 is disposed between the first substrate 510 and the second substrate 550. Wherein, when shift occurs between the first substrate 510 and the second substrate 550, the main spacer 560 moves away from the first protrusions 590, at the same time, the compensation spacer 570 comes into contact with the adjacent first protrusions 590, and the reduced contacting area between the main spacer 560 and the first protrusions 590 is equal to the increased contacting area between the compensation spacer 570 and the first protrusions 590.

In an embodiment, the horizontal conductive lines 520 may be scan lines, or Cs lines, while the vertical conductive lines 530 may be data lines, or Cs lines. In addition, the first substrate 510 may be TFT array substrate, and the second substrate 550 may be CF substrate.

Referring to FIG. 5A, in an embodiment, the area of the first protrusion 590 is greater than the areas of the main spacer 560 and the compensation spacer 570. However, in another embodiment, the area of the first protrusion 590 may also be smaller than the areas of the main spacer 560 and the compensation spacer 570 (not shown).

The biased compensation in horizontal direction of the LCD panel 500 in the present embodiment will be further described below. Referring to FIG. 5, in an embodiment, the horizontal conductive lines 520 include a first horizontal conductive line 520a, a second horizontal conductive line 520b, and a third horizontal conductive line 520c, and the second horizontal conductive line 520b is disposed between the first horizontal conductive line 520a and the third horizontal conductive line 520c. The compensation spacer 570 includes a first compensation spacer 570a and a second compensation spacer 570b respectively disposed on the first horizontal conductive line 520a and on the third horizontal conductive line 520c in the first area 510a.

It is remarkable that the main spacer 560 retracts a first distance B from the edge of the first protrusion 590 in contact therewith along direction −X and a second distance C along direction +X. The first compensation spacer 570a is at the aforementioned second distance C from the first protrusion 590 on the first horizontal conductive line 520a in the first area 510a. The second compensation spacer 570b is at the aforementioned first distance B from the first protrusion 590 on the third horizontal conductive line 520c in the first area 510a.

When the shifting distance of the main spacer 560 along direction −X is greater than the second distance C and smaller than the sum of the second distance C and the width W1 of the first compensation spacer 570a itself on axis X, the first compensation spacer 570a will be in contact with the first protrusion 590 on the first horizontal conductive line 520a so that the reduced contacting area between the main spacer 560 and the first protrusion 590 on the second horizontal conductive line 520b is equal to the increased contacting area between the first compensation spacer 570a and the first protrusion 590 on the first horizontal conductive line 520a.

When the shifting distance of the main spacer 560 along direction +X is greater than the first distance B and smaller than the sum of the first distance B and the width W2 of the second compensation spacer 570b itself on axis X, the second compensation spacer 570b will be in contact with the first protrusion 590 on the third horizontal conductive line 520c so that the reduced contacting area between the main spacer 560 and the first protrusion 590 on the second horizontal conductive line 520b is equal to the increased contacting area between the second compensation spacer 570b and the first protrusion 590 on the third horizontal conductive line 520c.

Accordingly, the main spacer 560 has the compensation value of the second distance C in direction −X and the first distance B in direction +X when the horizontal shifting distance of the LCD panel 500 is small. However, according to the design described above, the LCD panel 500 can compensate the horizontal shift within the range of "W1+C" or "W2+B" when the horizontal panel shift is greater than the first distance B or the second distance C.

Thus, the LCD panel 500 in the present invention can compensate large panel shift horizontally, and the LCD panel 500 can obtain consistent compressing density of the spacers and uniform panel gap, and further better display performance, even though the panel shift is large.

In particular, in the present embodiment, the support pads 540 are disposed under the horizontal conductive lines 520 and the vertical conductive lines 530 to form the first protrusions 590. Thus, compared to the first embodiment and the second embodiment, the positions of the first protrusions 590 in the present embodiment can be self-determined so as to obtain better biased compensation effect.

The Fourth Embodiment

FIG. 6 is a top view of an LCD panel according to the fourth embodiment of the present invention. Referring to FIG. 6, the LCD panel 502 has compensation spacers 570 both horizontally and vertically, wherein the disposition of the first compensation spacer 570a and the second compensation spacer 570b in horizontal direction is the same as that shown in FIG. 5, so the detail will not be described again.

In addition, the horizontal conductive lines 520 may be scan lines, or Cs lines. The vertical conductive lines 530 may be data lines, or Cs lines. Moreover, the first substrate 510 may be TFT array substrate, and the second substrate 550 may be CF substrate.

Similarly, as shown in FIG. 6, the area of the first protrusion 590 is greater than the areas of the main spacers 560 and the compensation spacer 570. However, the area of the first protrusion 590 may also be smaller than the areas of the main spacers 560 and the compensation spacer 570 (not shown).

It is remarkable that the compensation spacer 570 in the LCD panel 502 can further includes a third compensation spacer 570c and a fourth compensation spacer 570d respectively disposed on the second horizontal conductive line 520b in the second area 510b and on the second horizontal conductive line 520b in the third area 510c.

In particular, the main spacer 560 is at the third distance D from the upper edge of the second horizontal conductive line 520b in direction +Y and at the fourth distance E from the lower edge of the second horizontal conductive line 520b in direction −Y. The third compensation spacer 570c is at the aforementioned third distance D from the first protrusion 590 on the second horizontal conductive line 520b in the second area 510b. The fourth compensation spacer 570d is at the fourth distance E from the first protrusion 590 on the second horizontal conductive line 520b in the third area 510c.

When the shifting distance of the main spacer 560 along direction −Y is greater than the fourth distance E and smaller than the sum of the fourth distance E and the width W4 of the fourth compensation spacer itself on axis Y, the fourth compensation spacer 570d will be in contact with the first protrusion 590 on the second horizontal conductive line 520b in the third area 510c so that the reduced contacting area between the main spacer 560 and the first protrusion 590 on the second horizontal conductive line 520b is equal to the increased contacting area between the fourth compensation spacer 570d and the first protrusion 590 on the second horizontal conductive line 520b in the third area 510c.

When the shifting distance of the main spacer 560 along direction +Y is greater than the third distance D and smaller than the sum of the third distance D and the width W3 of the third compensation spacer itself on axis Y, the third compensation spacer 570c will be in contact with the first protrusion 590 on the second horizontal conductive line 520b in the second area 510b so that the reduced contacting area between the main spacer 560 and the first protrusion 590 on the second horizontal conductive line 520b is equal to the increased contacting area between the third compensation spacer 570c and the first protrusion 590 on the second horizontal conductive line 520b in the second area 510b.

Accordingly, the main spacer 560 has the compensation value of the fourth distance E in direction −Y and the third distance D in direction +Y when the vertical shifting distance of the LCD panel 502 is small. However, according to the design described above, the LCD panel 502 can also compensate the vertical panel shift within the range of "W3+D" or "W4+E" when the vertical panel shift is greater than the third distance D or the fourth distance E. In addition, the LCD panel 502 allows large panel shift both horizontally and vertically since the first compensation spacer 570a and the second compensation spacer 570b are also disposed. Accordingly, the LCD panel 502 can have uniform compressing density of the spacers and consistent panel gap, and further better display performance, even though the panel shift is large.

It is remarkable that the positions of the first protrusions 590 can be self-determined to obtain better biased compensation effect because the first protrusions 590 are formed by support pads 540.

In addition, the support pads 540 in the present embodiment can be the thin film in thin film transistors (not shown), so that the first protrusion 590 can be formed by the protrusions on the thin film transistors. As described above, biased compensation in both horizontal and vertical directions can be performed by letting the main spacer 560 be in contact with a first protrusion 590 of a thin film transistor and disposing the compensation spacer 570 around the main spacer 560.

In overview, the LCD panel in the present invention has the following advantages:

With the disposition the main spacer and the compensation spacer in the present invention, large panel shift can be compensated in horizontal and vertical directions, and uniform compressing density of the spacers and consistent panel gap can be obtained. In addition, by using the support pads, the flexibility in disposing the first protrusions is improved, and the biased compensation effect is further improved. Since the LCD panel in the present invention has uniform panel gap and is not affected by panel shift, the LCD panel in the present invention can have outstanding display performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An LCD panel, having a horizontal direction and a vertical direction in a plane, the LCD panel comprising:
   a first substrate;
   a plurality of horizontal and vertical conductive lines, disposed on the first substrate and dividing the first substrate into a first area, a second area, and a third area;
   a plurality of support pads, respectively disposed under and directly connected to at least one of the horizontal and vertical conductive lines to form a plurality of first protrusions;
   a second substrate, disposed over the first substrate and partially overlapped with the first substrate in the horizontal or vertical direction;
   a main spacer and a compensation spacer, disposed on the second substrate, the main spacer and the compensation spacer being in sliding contact with the first protrusions in the horizontal or vertical direction, the compensation spacer being disposed around the main spacer and corresponding first protrusions are also disposed next to the compensation spacer, and the main spacer is directly connected to the plurality of horizontal conductive lines; and a liquid crystal layer, disposed between the first substrate and the second substrate;

in the horizontal or vertical direction, the main spacer is partially contacted with the first protrusion to obtain a reduced contacting area, at the same time, the compensation spacer is partially contacted with the adjacent first protrusion to obtain an increased contacting area, and the reduced contacting area between the main spacer and the first protrusions is equal to the increased contacting area between the compensation spacer and the first protrusions, wherein the horizontal conductive lines include a first horizontal conductive line, a second horizontal conductive line, and a third horizontal conductive line, and the second horizontal conductive line is disposed between the first horizontal conductive line and the third horizontal conductive line, the main spacer is disposed on the second horizontal conductive line in the first area, the compensation spacer includes a first compensation spacer and a second compensation spacer respectively disposed on the first horizontal conductive line and the third horizontal conductive line in the first area;

the main spacer is in contact with the first protrusion disposed on the second horizontal line in the first area, and a first distance is between a first edge of the main spacer and a first edge of the first protrusion along direction −X, a second distance is between a second edge of the main spacer and a second edge of the first protrusion along direction +X;

the first compensation spacer is at the second distance from the first protrusion disposed on the first horizontal conductive line in the first area; and the second compensation spacer is at the first distance from the first protrusion disposed on the third horizontal conductive line in the first area.

2. The LCD panel as claimed in claim 1, wherein the area of each of the first protrusions is greater than the areas of the main spacer and the compensation spacer.

3. The LCD panel as claimed in claim 1, wherein the area of each of the first protrusions is smaller than the areas of the main spacer and the compensation spacer.

4. The LCD panel as claimed in claim 1, wherein in response to a shifting distance of the main spacer along direction −X being greater than the second distance and smaller than the sum of the second distance and the width of the first compensation spacer itself on axis X, the first compensation spacer contacts the first protrusion on the first horizontal conductive line so that the reduced contacting area between the main spacer and the first protrusion on the second horizontal conductive line is equal to the increased contacting area between the first compensation spacer and the first protrusion on the first horizontal conductive line.

5. The LCD panel as claimed in claim 1, wherein in response to a shifting distance of the main spacer along direction +X being greater than the first distance and smaller than the sum of the first distance and the width of the second compensation spacer itself on axis X, the second compensation spacer contacts the first protrusion on the third horizontal conductive line so that the reduced contacting area between the main spacer and the first protrusion on the second horizontal conductive line is equal to the increased contacting area between the second compensation spacer and the first protrusion on the third horizontal conductive line.

6. The LCD panel as claimed in claim 1, wherein the compensation spacer further includes a third compensation spacer and a fourth compensation spacer respectively disposed on the second horizontal conductive line in the second area and on the second horizontal conductive line in the third area;

the main spacer is at a third distance from the upper edge of the second horizontal conductive line in direction +Y and at a fourth distance from the lower edge of the second horizontal conductive line in direction −Y;

the third compensation spacer is at the third distance from the first protrusion on the second horizontal conductive line in the second area; and the fourth compensation spacer is at the fourth distance from the first protrusion on the second horizontal conductive line in the third area.

7. The LCD panel as claimed in claim 6, wherein in response to a shifting distance of the main spacer along −Y direction being greater than the fourth distance and smaller than the sum of the fourth distance and the width of the fourth compensation spacer itself on axis Y, the fourth compensation spacer contacts the first protrusion on the second horizontal conductive line in the third area so that the reduced contacting area between the main spacer and the first protrusion on the second horizontal conductive line is equal to the increased contacting area between the fourth compensation spacer and the first protrusion on the second horizontal conductive line in the third area.

8. The LCD panel as claimed in claim 6, wherein in response to a shifting distance of the main spacer along direction +Y being greater than the third distance and smaller than the sum of the third distance and the width of the third compensation spacer itself on axis Y, the third compensation spacer contacts the first protrusion on the second horizontal conductive line in the second area so that the reduced contacting area between the main spacer and the first protrusion on the second horizontal conductive line is equal to the increased contacting area between the third compensation spacer and the first protrusion on the second horizontal conductive line in the second area.

9. The LCD panel as claimed in claim 1, wherein at least one of the horizontal and vertical conductive lines includes scan line, Cs line, or data line.

10. The LCD panel as claimed in claim 1, wherein the first substrate includes TFT array substrate.

11. The LCD panel as claimed in claim 1, wherein the second substrate includes CF substrate.

* * * * *